J. R. MOUSLEY.
SHOCK ABSORBER FOR MOTOR CARS.
APPLICATION FILED SEPT. 17, 1917.

1,269,731.

Patented June 18, 1918.

INVENTOR
J. R. Mousley.
BY
George A. Thorpe
ATTORNEY

UNITED STATES PATENT OFFICE.

JOHN R. MOUSLEY, OF KANSAS CITY, MISSOURI.

SHOCK-ABSORBER FOR MOTOR-CARS.

1,269,731.  Specification of Letters Patent.  Patented June 18, 1918.

Application filed September 17, 1917. Serial No. 191,877.

*To all whom it may concern:*

Be it known that I, JOHN R. MOUSLEY, a citizen of the United States, and resident of Kansas City, in the county of Jackson and State of Missouri, have invented certain new and useful Improvements in Shock-Absorbers for Motor-Cars, of which the following is a specification.

This invention relates to shock absorbers for motor cars, and more especially to that class of shock absorbers which employ relatively weak springs for chiefly supporting light loads, and under heavy loads to cause the main or regular springs to take up the load, and supplemental springs for absorbing or cushioning the reaction or recoil, the class of shock absorber described being embodied in my application Ser. No. 190,275, filed September 6, 1917.

My special object is to provide a modified form of the application above mentioned.

To this end the invention consists in the novel construction and combination of its parts, as hereinafter described and claimed; and in order that it may be fully understood reference is to be had to the accompanying drawing, in which:

Figure 1:
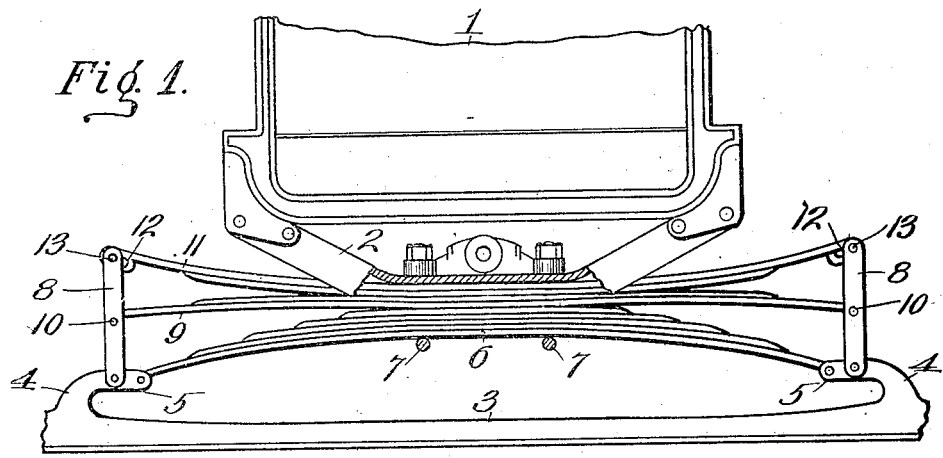
Figure 1, is a fragmentary front view of a motor car equipped with a shock absorber embodying my invention.
Figure 2:
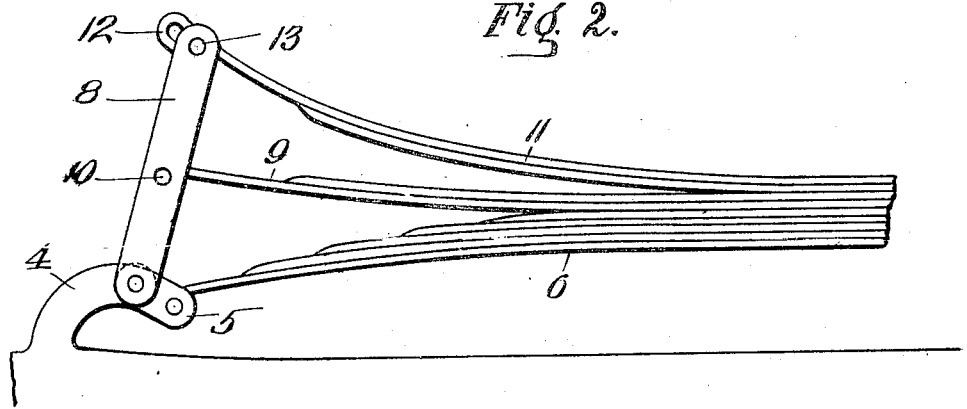
Fig. 2, is a diagrammatic front view indicating the relative position of the parts when the car body occupies a depressed position, as when heavily loaded or at its downward limit of movement produced by the passage of a car over any irregularity in the roadway.
Figure 3:
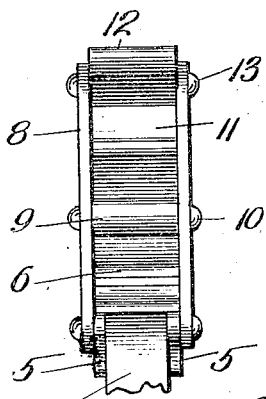
Fig. 3, is an end view of the construction as it appears in Fig. 2.

In the said drawing, 1 indicates the radiator, 2 the customary channel iron cross bar, and 3 the front axle underlying said cross bar. The axle is shown as provided with upstanding lugs 4 to which are pivoted, inwardly projecting links 5 pivotally connected by the main or regular spring 6 of the car, said spring being secured by the customary clip 7 to the channel iron cross bar 2.

8 are upstanding swinging frames pivoted at their lower ends on lugs 4 coincidentally with links 5, and superimposed upon the spring 6 is a spring 9 which is a weak spring as compared to spring 6, and said spring 9 is pivoted to cross pins 10 of swing frames 8. The tendency of spring 9 is to press the swing frames 8 apart or outwardly.

Superimposed upon spring 9 and with the latter rigidly secured between its ends, to the cross bar 2 by the clips 7 or the like, which fasten the main spring in position, is a bowed spring 11, said spring being bowed reversely to the main spring, and said spring 11 is provided at its ends with longitudinal loops or slots 12 slidingly receiving cross pins 13 of the swing frames 8. Normally, that is when the car is lightly loaded, the inner ends of the loops or slots are adjacent the pins 13, and the tendency of spring 11 at all times is to bow more sharply, that is to describe an arc of shorter radius than that which it describes in Fig. 1. For this reason said spring normally exerts an upward pressure on cross pins 13.

When the body of the car moves downward as under a light load and when traveling over a comparatively smooth roadway, the spring 9 will yield downward between the ends and the bow of the spring 11 will be slightly increased, the pins 13 sliding inward in the loops or slots 12, and as the upward reaction or recoil occurs, the spring 11 tending to bow more sharply, will resist and therefore absorb and cushion said recoil movement.

When the car moves downward under a heavy load or shock, the spring 9 yields as explained, but will yield to such extent that the load will be mainly imposed on spring 6, as the latter in moving downward a relatively great distance will offer an increasingly greater resistance as the links 5 swing downwardly and outwardly. The spring 11 in this case will be permitted to bow more sharply than before and the loops or slots 12 will move inward and exert an inward pull upon the cross pins 13 of the swing frames, and as the reaction or recoil occurs, the resistance of spring 11 to reverse movement will result in cushioning the rebound of the car body.

From the above description it will be apparent that the embodiment of the invention herein shown will perform the functions described, and it is to be understood that I reserve the right to make all changes in form, proportion, detail construction and organization of parts as properly full within the spirit and scope of the appended claims.

I claim:

1. The combination in a motor car provided with a body-supporting spring, of a pair of swing frames mounted upon the axle, and a pair of springs superposed with relation to the first-named spring, the uppermost of said springs having play connections with the upper ends of said swing frames and exerting upward and inward pressure thereon; the other of said pair of springs having connections with said swing frames intermediate the length of and exerting pressure on the latter.

2. The combination in a motor car having a transverse spring interposed between and connected to the axle and frame of the car, of a pair of superposed springs mounted upon the first-named spring, and a pair of spring frames mounted on and projecting upward from the axle and pivotally connected to the lower of said pair of superposed springs and having pin-and-slot connection with the upper of said pair of springs; said upper spring exerting force tending to move said swing frames upwardly and inwardly.

In testimony whereof, I affix my signature.

JOHN R. MOUSLEY.